United States Patent [19]
Lamm et al.

[11] Patent Number: 6,104,185
[45] Date of Patent: Aug. 15, 2000

[54] METHOD AND DEVICE FOR OPERATING A POSITION SENSOR

[75] Inventors: Hubert Lamm, Kappelrodeck; Guenter Haderer, Buehl, both of Germany

[73] Assignee: Robert Bosch GmbH, Stuttgart, Germany

[21] Appl. No.: 09/072,940

[22] Filed: May 5, 1998

[30] Foreign Application Priority Data

May 21, 1997 [DE] Germany ............................ 197 21 152
Feb. 14, 1998 [DE] Germany ............................ 198 06 099

[51] Int. Cl.⁷ ...................................................... G01B 7/14
[52] U.S. Cl. ................................ 324/207.2; 324/207.25; 324/207.12
[58] Field of Search ............................... 324/207.2, 165, 324/207.25, 208, 207, 166, 173, 174, 207.21, 207.22, 207.24, 207.16, 207.12; 318/287, 286, 560, 647, 568.16, 266, 282

[56] References Cited

U.S. PATENT DOCUMENTS

| | | |
|---|---|---|
| 4,313,114 | 1/1982 | Lee et al. . |
| 4,468,596 | 8/1984 | Kinzl et al. ............... 318/287 |
| 4,567,416 | 1/1986 | Brunier-Coulin . |
| 4,672,279 | 6/1987 | Hosokawa et al. . |
| 5,131,017 | 7/1992 | Huber et al. . |
| 5,486,759 | 1/1996 | Seiler et al. ........................ 324/207.2 |
| 5,500,585 | 3/1996 | Aab ........................................ 324/165 |

FOREIGN PATENT DOCUMENTS

| | | |
|---|---|---|
| 2 703 450 | 7/1994 | France . |
| 42 29 610 | 6/1993 | Germany . |
| 42 32 950 | 4/1994 | Germany . |
| 44 07 474 | 5/1995 | Germany . |
| 0590384B1 | 10/1997 | Germany . |

*Primary Examiner*—Christine K. Oda
*Assistant Examiner*—Anthony Jolly
*Attorney, Agent, or Firm*—Kenyon & Kenyon

[57] ABSTRACT

A method and a device for operating a position sensor made of at least two parts that move in relation to one another. The first part of the position sensor has at least two sections magnetized in different directions, and the second part has at least one magnetic field sensor which detects the magnetic field of the first part and converts it into signals having two levels depending on the polarity of the component of the magnetic field in a predefined spatial direction. The levels are supplied to a signal-processing arrangement which evaluates them to determine the relative position of the first part in relation to the second part. Prior to disabling the at least one magnetic field sensor when the first part is at a standstill with respect to the second part, the level delivered by the magnetic field sensor is stored, detected again after the magnetic sensor is enabled again, compared with the stored level, and if the measured level does not coincide with the stored level, the level change is evaluated as a valid level change.

22 Claims, 4 Drawing Sheets

METHOD AND DEVICE FOR OPERATING A POSITION SENSOR

BACKGROUND INFORMATION

German Patent No. 42 32 950 describes a device for controlling a position of an operating element using an electric motor drive unit controlled by a signal processing arrangement. An incremental position sensor for determining the actual position of the operating element is arranged in the drive unit. The incremental position sensor comprises a magnet wheel, arranged on a motor armature shaft, with a plurality of segments with differing magnetizations, as well as magnetic field sensors that are stationary in relation to the frame and are used as signal receivers that convert the north and south magnetization prevailing at the point of the magnetic field sensor into signals with two different levels. The magnet wheel moves by the amount of one segment with respect to the magnetic field sensor between two level changes of one of the magnetic field sensors. The actual position of the operating element with respect to a calibrating position is determined by counting the different successive levels and incrementing or decrementing the counter depending on the direction of rotation of the motor armature shaft.

If the power supply of the magnetic field sensors is turned off (for example, in order to save energy when the motor armature shaft is at rest), erroneous counts may occur which cause the incremental determination of the actual position of the actuator part to be erroneous also. As a result, a position determination recalibration will most likely have to be performed.

SUMMARY OF THE INVENTION

The method and device according to the present invention have the advantage that level changes are correctly detected even when the magnetic field sensor is disabled, for example, by disconnecting it from the power supply. Due to a switching hysteresis that occurs in many magnetic field sensors, the level delivered in the case of a very small magnetic field component in the spatial direction sensed by the magnetic sensor after a change in polarity does not correspond to the actual polarity of the component, but, until a specific field intensity threshold is exceeded, it corresponds to the reverse polarity, i.e., the polarity of the component prior to the change in polarity.

Such a change in polarity occurs when one transition region (which causes a hysteresis region) moves past differently magnetized sections of a first part on the magnetic field sensor. If the relative motion of the first part with regard to the second part is stopped in the hysteresis region and the magnetic field sensor is disabled, an erroneous level may occasionally be signaled prior to disabling. When the magnetic field sensor is enabled again, the hysteresis effect is no longer present, the level delivered is correct and in accordance with the true polarity of the magnetic field component. Due to this effect, a magnetic section of the first part is not taken into account in the detection of the magnetic field sensor, and the parameters derived from the detection are error-ridden. The method according to the present invention makes it possible to detect such switching hystereses when the magnetic field sensor is disabled. In evaluating the level, since it can be determined whether the level change is valid, it can then be determined whether it is caused by the change in the magnetic field due to the motion of the first part with respect to the second part.

If a valid change in level is detected when the at least one magnetic sensor has been disabled, the position of the first part relative to the second part, determined by the signal-processing arrangement, is advantageously corrected according to the change in level. In particular, when the segments are detected incrementally (i.e., in relation to previous detections), erroneous detections due to the magnetic sensor being disabled in a hysteresis region may add up and result in substantial and intolerable errors in determining position if the sensor is turned off frequently. The present invention may help avoid the additional cost of a permanently installed absolute value position detection.

The level of the magnetic field sensor for position detection can be evaluated in a particularly simple manner if the level change is detected and a counter is incremented or decremented (i.e., increased or decreased by one) in the event of a level change depending on the direction of the relative motion of the first part with respect to the second part. The counter then represents the relative position of the movable part with respect to an initial position and can be evaluated for incremental position detection. The level changes can be counted by one or more simple digital counters of the signal processing arrangement or under program control.

The use of two magnetic field sensors that detect the magnetic field of the first part offers the advantage of redundancy in the position detection. For certain geometric configurations of the sections and the magnetic field sensors, it is also possible to determine the direction of motion of the two parts with respect to one another by analyzing the phase shift of the levels of the two magnetic field sensors.

The use of two magnetic field sensors allows, under certain circumstances and in a simple manner, error detection in determining the relative positions of the two parts. If the distances between the boundaries of the magnetized sections are different from the distance between the two magnetic field sensor and a level change occurs in both magnetic field sensors while they are disabled, the relative position determined of the two parts is considered invalid. Under the above-mentioned circumstances, this situation may only arise upon outside intervention or in the event of a failure of the analysis logic. Since the magnetic field sensors were disabled, it is no longer ensured that the incrementally determined relative position of the two parts provides the actual relative position of the two parts. Recalibration of the incremental position detection may be provided as a response. However, when a level change has occurred in exactly one of the two magnetic field sensors, a position correction is advantageously performed according to the assumed valid level change. In this case, a switching hysteresis is assumed to be highly probable for the magnetic field sensor whose level has changed.

This method is preferably used when the position detector is arranged in an electric motor-gear drive unit, in particular for adjusting operating elements in motor vehicles such as windows and sliding or pop-up sunroofs. The first part of the position sensor is nonrotatably fastened onto the motor armature shaft, while the second part is arranged, for example, in the form of an electronic board with a magnetic field sensor, fastened to the housing of the electric motor drive unit, and the position sensor determines the rotation of the magnet wheel and thus of the motor armature shaft with respect to the motor stator. The stationary arrangement of the first part as a magnetic transducer on the housing of the drive unit and a magnetic field sensor rotating with the motor armature shaft is also conceivable. In particular when the current generator is shut off, the magnetic field sensors, which have a high power consumption, must be disabled in order to save the motor vehicle battery. The method ensures in this case that the position sensors operate properly.

The operation of the position sensors according to the present invention is particularly advantageous when the position of the operating element driven by the drive unit is determined from the rotation of the motor armature shaft with respect to the motor stator. While previously microswitches or other means for absolute position detection were provided at the end stops of the operating element for recalibrating its position, the number of erroneous counts can be substantially reduced. This reduces the number of required recalibration runs and, instead of recalibration using microswitches, other methods that are less costly to implement can be used for recalibration. For example, recalibration via motion against an end stop and detection of the motor current is conceivable. In some cases recalibration can be omitted altogether. However, when microswitches have to be used, they are subject to reduced wear and have a longer life. In addition, operator comfort is increased, since the time needed for recalibration is considerably shortened.

Furthermore, the use of the method according to the present invention is advantageous if the levels are to be evaluated for determining velocity and/or acceleration and/or direction of relative movement of the first and second parts and/or a force transmitted through the moved part. Since position changes are detected more accurately by the position sensor and these parameters depend on the change in the relative position of the parts, the error in determining them is smaller.

In a further embodiment, the method according to the present invention allows very accurate relative positioning of the parts at positions defined by the hysteresis regions between the magnetized sections of the first part, in that the parts are moved repeatedly with respect to one another in steps that are small in comparison with the size of the hysteresis region, the at least one magnetic field sensor is disabled and, after a predefinable period, enabled again, until the level of the magnetic field sensor, stored prior to being disabled, no longer agrees with the level delivered after being enabled again. In this case, the magnetic sensor detects a hysteresis region of the first part. For n differently magnetized magnetic sections on a rotating magnet wheel, there are n hysteresis regions; by using m magnetic field sensors, up to n*m positions can be set with a high accuracy by far exceeding the normal resolution of the position sensor. While normally the resolution is not better than the size of a magnetized section, in this case it is on the order of magnitude of the hysteresis region, which is normally much smaller.

The relative motion of the parts by steps that are small in comparison with the size of the magnetized sections can be accomplished, for example, through very short drive pulses of the device driving the parts.

One refinement of the present invention is based on the recognition of the fact that when at least one magnetic field sensor is disabled by shutting off its power supply, a level change may occur, depending on the state of the sensor outputs, which however is not caused by an actual polarity change at the location of the sensor. Rather, this level change can be explained by oscillations caused by a switching-off and the capacitive and inductive resistances of the drive electronics or the position sensors themselves. This effect is manifested in particular when magnetic field sensors, such as Hall sensors, have open collector outputs. Therefore, according to the present invention, when the magnetic field sensor is disabled and the first part is at a standstill with respect to the second part, the levels sent by the magnetic field sensor to the signal processing arrangement are evaluated as invalid and are not taken into consideration in position determinations (such as, for example, in the incremental position detection). This ensures that only those level changes caused by a movement of the magnet wheel are counted.

In an advantageous embodiment of the method, the signal-processing arrangement is controlled by a program. In the event of a level change, the normal program-controlled operation, which is preferably executed by a microcontroller in the signal-processing arrangement and may include various other tasks in addition to position detection, is interrupted and the interrupt subprogram, where the level change is analyzed, is executed. After analyzing the level change, the normal program-controlled operation is resumed. By separating the normal program-controlled operation from level change analysis in the interrupt subprogram, the analysis of the valid level change is ensured; even during processing of complex subprograms, no valid level change is lost. In addition, the method according to the present invention can be easily implemented in the interrupt subprogram.

In a particularly simple embodiment of this method, a flag is set prior to disabling the magnetic field sensor, the flag is reset after re-enabling the magnetic sensor, and a level change while the flag is set is not analyzed. The interrupt subprogram checks whether a flag is set, and considers a level change valid or invalid depending on whether the flag is set. In the latter case, the level change is not taken into account in an incremental position detection.

BRIEF DESCRIPTION OF THE DRAWINGS

FIG. 4b shows a second section of the flowchart of the second refinement of the method illustrated in FIG. 4a.

DETAILED DESCRIPTION

Figure 1:
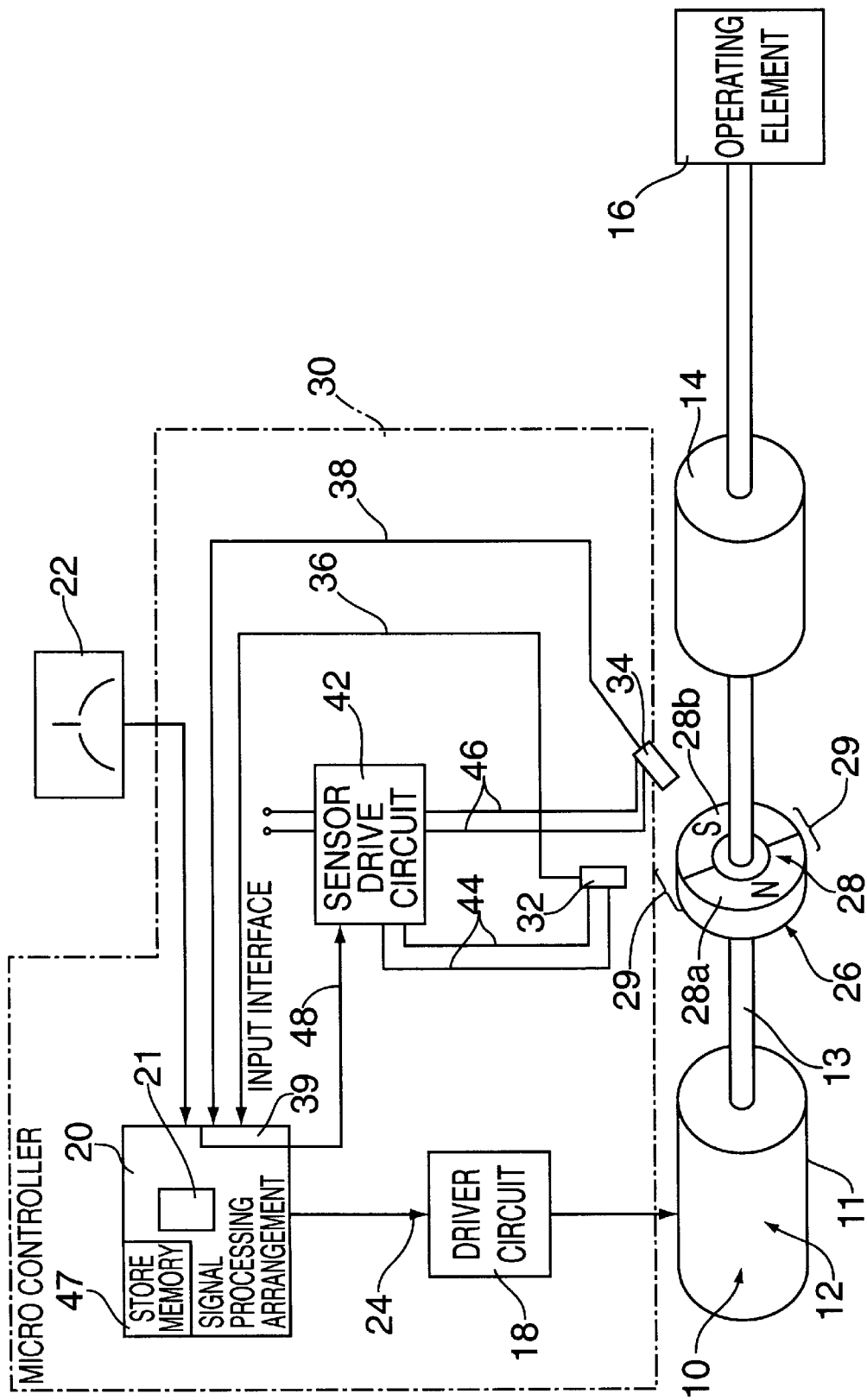
FIG. 1 shows a block diagram of a device using a first exemplary method according to the present invention.

FIG. 1 illustrates an exemplary device implementing the method according to the present invention. An electric motor drive unit 10 with an electric motor 12 drives an operating element 16 via gear 14. The operating element can be, for example, a sliding/pop-up motor vehicle sunroof, a motor vehicle power window, an adjustable seat, an adjustable mirror, a vent shutter, for example, for air conditioning, etc. Electric motor 12 has a motor armature shaft 13, which rotates with respect to stator 11 of electric motor 12. A signal-processing arrangement 20 controls electric motor 12 in an open and/or closed loop according to actuating commands issued by an operating unit 22 via a driver circuit 18. Driver circuit 18 supplies power to electric motor 12 and influences its speed by changing the power supply, for example, by cycling, and its direction of rotation as a function of a control signal 24 transmitted by signal-processing device 20.

Electric motor 12 has a position sensor 26 comprising a first part 28, non-rotatably arranged on motor armature shaft 13 of electric motor 12, and a second part 30 in the form of an electronic board, which is arranged in a motor housing (not shown) together with stator 11.

First part 28 is designed as a magnet wheel, which has two sections 28a and 28b, magnetized in opposite directions. Hysteresis regions 29 are located in the transition regions between magnetized sections 28a and 28b. Two Hall sensors 32 and 34 are arranged on electronic board 30 (second part) at a 90° angle in the peripheral direction of magnet wheel 28. Hall sensors 32, 34 generate sensor signals 36, 38 with levels dependent on the polarity of the magnetic field component in a spatial direction given by the normals to the planes of Hall sensors 32, 34. A polarity change in the magnetic field components in the direction of the normal to the plane takes place when one of the two hysteresis regions 29 moves past a Hall sensor 32, 34. Sensor signals 36, 38 are supplied to signal-processing arrangement 20 via an input interface 39. The two Hall sensors 32, 34 are supplied with power by a sensor driver circuit 42 via lines 44, 46. Signal-processing arrangement 20 affects sensor driver circuit 42 via an operating signal 48 and can disable and re-enable Hall sensors 32, 34 by switching their power supply.

Figure 2A:
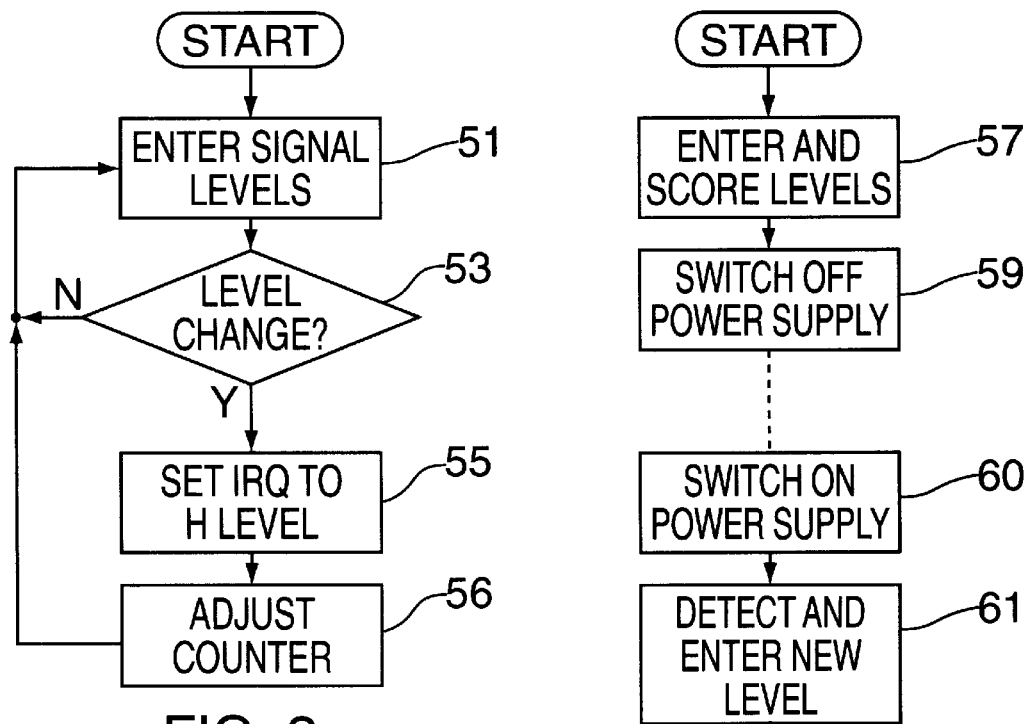
FIG. 2a shows a first section of a flowchart of the method according to the present invention.
Figure 2B:
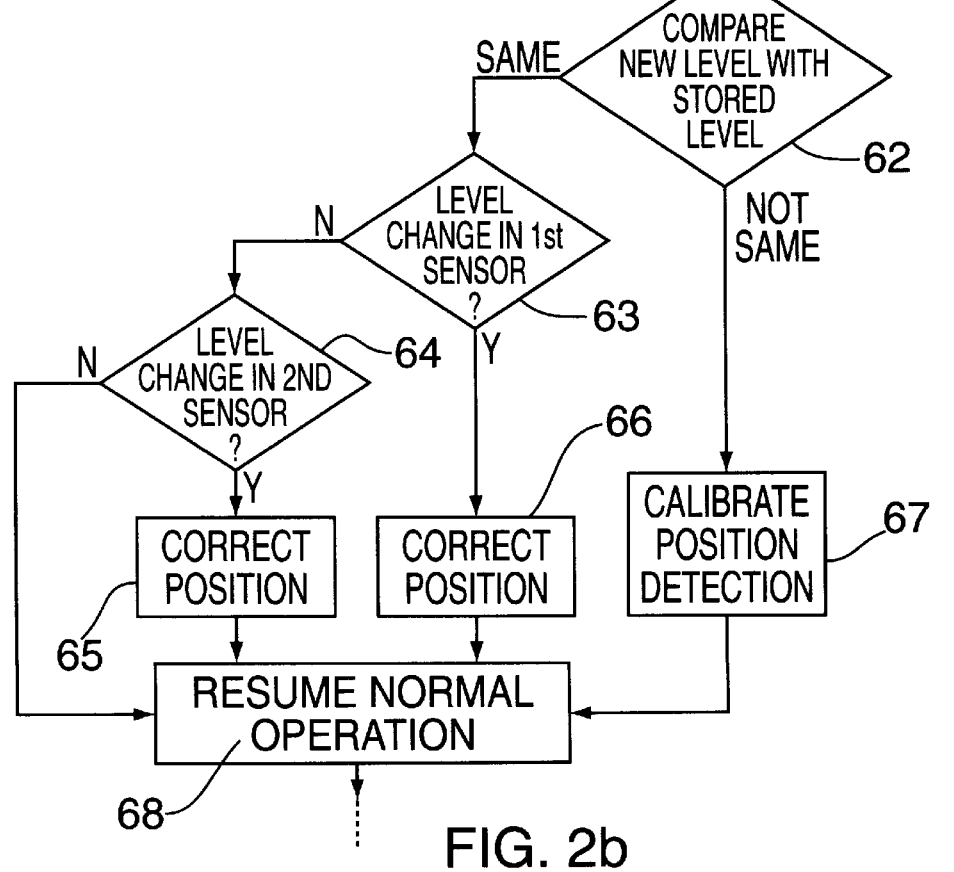
FIG. 2b shows a second section of the flowchart of the method according to the present invention.

The device shown in FIG. 1 works by the method shown as flowcharts in FIGS. 2a and 2b to operate position sensor 26. FIG. 2a shows how position sensor 26 is operated to detect the position of magnet wheel 28 with respect to electronic board 30 and thus to stator 11 of electric motor 12. The levels of sensor signals 36, 38 are entered by the signal-processing arrangement via input interface 39 in step 51 of the method. In step 53 input interface 39 checks whether one of the two levels has changed. This is the case when magnet wheel 28 has moved with respect to Hall sensors 32, 34 and a polarity change of the magnetic field component detected by the respective Hall sensors has taken place. Then input interface 39 triggers an interrupt of the normal program-controlled operation of microcontroller 21 in signal-processing arrangement 20 in step 55 in that it sets an H level on an IRQ input of microcontroller 21. Microcontroller 21 executes an interrupt subprogram in step 56, in which a counter associated with the respective Hall sensor 32 or 34 is incremented or decremented by signal-processing arrangement 20 depending on the direction of rotation of electric motor 12. After completion of the analysis routine, microcontroller 21 in signal-processing arrangement 20 resumes normal program-controlled operation at the point where it was interrupted by the IRQ signal. The process then branches again to step 51.

The counters associated with Hall sensors 32, 34 are implemented as variables in a memory 47 of signal-processing arrangement 20. The count is normalized to a calibrating position of magnet wheel 28 corresponding to an end stop of operating element 16. Thus the count represents the position of magnet wheel 28 with respect to Hall sensors 32, 34 fastened to the electric motor drive unit and thus of motor armature shaft 13 with respect to stator 11 of electric motor 12. Thus the rotation of motor armature shaft 13 is detected by position sensor 26. Furthermore, the position of operating element 16 is determined by analyzing the counter.

In order to keep the power consumption of drive unit 10 low, the Hall sensors are disabled, optionally after the elapse of a waiting period when motor armature shaft 12 is disabled by the procedure illustrated in FIG. 2b. In step 57, the levels delivered by the two Hall sensors 32, 34 are entered via input interface 39 and stored in memory 47 of signal-processing arrangement 20. In step 59 signal-processing arrangement 20 causes sensor driver circuit 42 to switch off the power supply to Hall sensors 32 and 34 via operating signal 48.

The power supply to Hall sensors 32 and 34 is switched on again in step 60 if a wake-up condition is met, e.g., if the motor is to be enabled again. In step 61, signal-processing arrangement 20 detects and enters the levels delivered by Hall sensors 32, 34 after the motor has been enabled. In step 62, the stored levels for the two Hall sensors 32 and 34 are compared with the newly detected levels. If the stored and newly detected levels for Hall sensor 32 and Hall sensor 34 are not the same, the process branches to step 67. Since segments 28a and 28b are 180° long, while Hall sensors 32, 34, are arranged at a 90° angle in the peripheral direction, this case may occur only in the case of a fault, since both Hall sensors 32 and 34 cannot be in the same hysteresis region 29 of magnet wheel 28 at the same time. The fault may be caused, for example, by a mechanical forced displacement while Hall sensors 32, 34 were disabled; the influence of interferences on the level evaluation, however, is also conceivable. Regardless of the cause, denormalization of the position detection must be assumed in this case. Therefore in step 67, a calibration of the position detection of operating element 16 is carried out by moving a microswitch (not shown), which is actuated when the operating element is in the calibrating position. When the microswitch is actuated, the counts of both counters are set to predefined calibration values. After completion of the calibration, the normal operation of the signal-processing arrangement is resumed in step 68.

If query 62 finds that no level change has taken place for both Hall sensors 32, 34, a query in 63 checks whether the level delivered by Hall sensor 32 has changed. If this is the case, the level change is evaluated as a valid level change in step 66, and the determined relative position of magnet wheel 28 with respect to Hall sensors 32, 34 is corrected by incrementing or decrementing the counter associated with Hall sensor 32 depending on the direction of rotation of the motor before the Hall sensor was disabled. In this case the level change is probably caused by the fact that the respective Hall sensor 32 is opposite a hysteresis region 29 between the two magnetic sections 28a and 28b of magnet wheel 28. After position correction in step 66, the process also in this case branches to step 68.

If in step 63 the levels for Hall sensor 32 are the same, in step 64 the levels for Hall sensor 34 are compared. If they are not the same, in step 65 the count of the counter associated with Hall sensor 34 is corrected; then the program branches to step 68. Also in query 64, the program branches to step 68 if the stored and detected levels of Hall sensor 34 are the same after the sensor is enabled again.

As described above, the counters of position sensor 26 are analyzed by signal-processing arrangement 20 to determine the position of operating element 16. In addition, the levels of Hall sensors 32, 34 and/or the counts of the counters associated with them are analyzed to determine the velocity, acceleration, direction of rotation of the rotating part and the torque transmitted via the rotating part. The determined values of these parameters can be used to perform a procedure that recognizes, for example, an object or a body part pinched by operating element 16.

In addition to this application in normal operation, the method according to the present invention can also be used for moving the operating element into precisely defined positions. The desired positions thus selected are given by the arrangement of Hall sensors 32, 34 and the hysteresis regions 29 of magnet wheel 28. Those geometrically feasible configurations for which hysteresis region 29 is in the direct proximity of one of Hall sensors 32, 34 can be selected as desired positions; one of these positions, referred to hereinafter as a desired hysteresis position, is also defined by the selection of a hysteresis region 29 of magnet wheel 28 and one of the two Hall sensors 32 or 34, as well as a desired count for the selected Hall sensor 32 or 34 for a rough positioning in the proximity of the desired hysteresis position.

Figure 3:
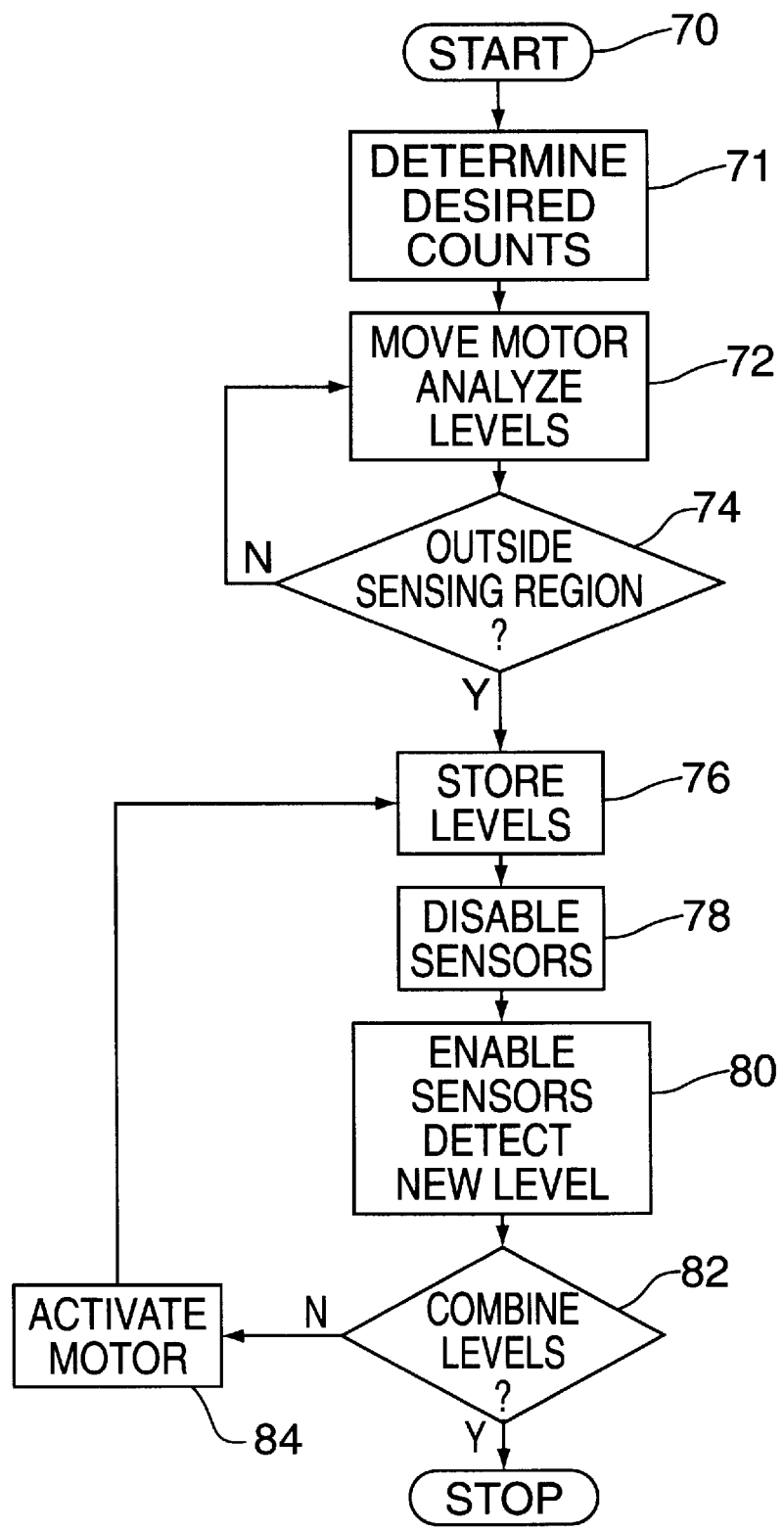
FIG. 3 shows a flow chart of a first refinement of the method according to the present invention.

When one of these desired hysteresis positions is defined by operating unit 22 on signal-processing arrangement 20, the procedure illustrated in FIG. 3 is carried out to perform a movement into the desired hysteresis position. After starting the procedure in step 70, in step 71 the signal-processing arrangement determines the desired counts of the counters associated with Hall sensors 32, 34 for the given desired hysteresis position and, if the counts do not agree with the actual counts, causes electric motor 12 to move in step 72.

During the movement of the electric motor, signal-processing arrangement 20 analyzes the level of Hall sensors 32 and 34 as described above to determine the position of operating element 16 and the position of magnet wheel 28. In the following step 74, the signal-processing arrangement checks whether the actual counts are selected so that the selected hysteresis region 29 is just outside the sensing range of the selected Hall sensor 32 or 34. If the desired and actual counts are not the same, electric motor 12 continues to move in step 72; otherwise the levels of both Hall sensors 32 and 34 are stored in step 76 and then in step 78 Hall sensors 32 and 34 are disabled. After a predefinable delay, Hall sensors 32 and 34 are enabled again in step 80. The delay is selected so that hysteresis effects of Hall sensors 32, 34 are likely to be eliminated; if appropriate, Hall sensors 32, 34 can also be demagnetized. In step 82 the levels of Hall sensors 32 and 34 are determined again and compared with the stored levels. If a level change has occurred for the Hall sensor 32 or 34 selected for the desired hysteresis position during the rest period, but not for the other Hall sensor 34 or 32, motor armature shaft 13 of electric motor 12 is positioned so that the boundary region between the two magnetic segments 28a and 28b is located exactly underneath the selected Hall sensor 32 or 34. If no level change has occurred, signal-processing arrangement 20 activates electric motor 12 for a very short period of time in step 84. This period is selected so that motor armature shaft 13 moves in steps that are small compared to the size of hysteresis regions 29. Then the process branches back to step 76. This procedure also allows motor armature shaft 13 of electric motor 12 and thus operating element 16 to be positioned into the desired hysteresis positions with a resolution given by the size of hysteresis regions 29.

Figure 4A:
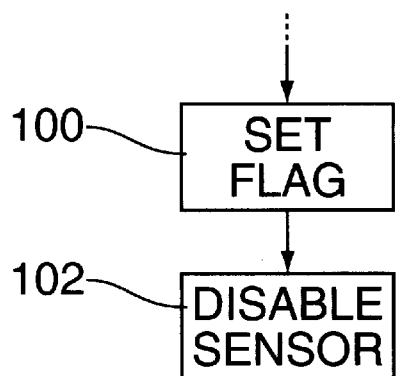
FIG. 4a shows a first section of a flowchart of a second refinement of the method according to the present invention.
Figure 4B:
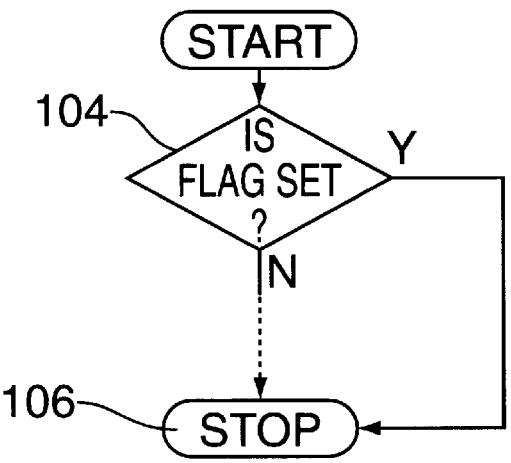
Figure 4C:
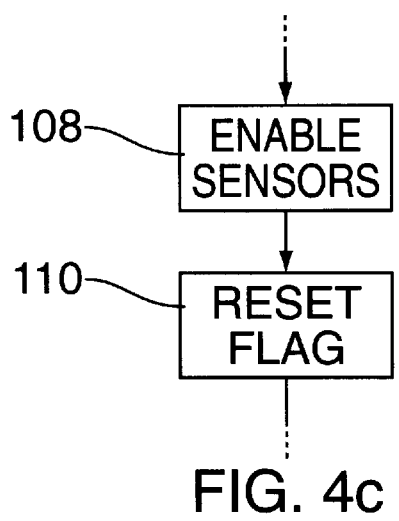
FIG. 4c shows a third section of the flowchart of the second refinement of the method illustrated in FIGS. 4a and 4b.

Another refinement of the method according to the present invention is illustrated in FIGS. 4a through 4c. The analysis of the level change of Hall sensors 32, 34 by signal-processing arrangement 20 takes place, as described above, by an interrupt-controlled program operation. The method illustrated in FIG. 4a ensures that no spurious pulses are accidentally counted as valid level changes while Hall sensors 32, 34 are disabled and motor armature shaft 13 and thus magnet wheel 28 are at a standstill. To this end, prior to disabling Hall sensors 32, 34, process step 100, illustrated in FIG. 4, in which a flag is set in memory 47 of signal-processing arrangement 20, is performed. Subsequently Hall sensors 32, 34 are disabled by sensor drive circuit 42 in step 102 by cutting off their power supply.

FIG. 4b shows a section of an interrupt subprogram, which is executed by microcontroller 21 in response to an interrupt by input interface 39 in the event of a level change. In first step 104 after the start of the interrupt subprogram, a query is made whether flag is set. The procedure is run in its entirety only if the flag is not set; otherwise, the process branches immediately to end 106 of the interrupt program. This ensures that interference in the lines leading to signal-processing arrangement 20 or the oscillations that occur when Hall sensors 32, 34 are switched off are not counted as valid level changes, causing an incorrect position of operating element 16 to be determined by signal-processing arrangement 20.

Hall sensors 32, 34 are enabled again using the procedure illustrated in FIG. 4c. In step 108 Hall sensors 32, 34 are supplied with power again. The flag is reset in step 110 after the elapse of a delay starting from the switching-on of the power supply, which is selected so that the Hall sensors are operational again. Electric motor 12 is actuated again at this time. When microcontroller 21 triggers the next interrupt, the level change is taken into account again as a valid level change.

What is claimed is:

1. A method for operating a position sensor having a first part and a second part, one of the first part and the second part being movable in relation to the other one of the first part and the second part, the first part having a first section magnetized in a first direction and a second section magnetized in a second direction that is different from the first direction, and the second part having at least one magnetic field sensor, the method comprising the steps of:

detecting a magnetic field of the first part with the at least one magnetic field sensor;

converting the detected magnetic field into a signal having two levels depending on a polarity of a component of the magnetic field in a predefined spatial direction;

analyzing the signal to determine a relative position of the first part in relation to the second part;

detecting and storing a first level of the signal prior to a disabling of the at least one magnetic field sensor when the first part is at a standstill in relation to the second part;

subsequently detecting a second level of the signal and comparing the detected second level with the stored first level when the at least one magnetic field sensor is enabled; and recognizing a valid level change if the detected second level is different from the stored first level.

2. The method according to claim 1, further comprising the step of correcting the determined relative position of the first part in relation to the second part as a function of the recognition of the valid level change.

3. The method according to claim 1, wherein a counter is incremented or decremented as a function of a direction of movement of the first part in relation to the second part if the valid level change is recognized.

4. The method according to claim 1, wherein the at least one magnetic field sensor includes a first magnetic field sensor and a second magnetic field sensor.

5. The method according to claim 4, further comprising the step of correcting the determined relative position if a level change is determined to have taken place for exactly one of the first magnetic field sensor and the second magnetic field sensor.

6. The method according to claim 4, wherein the determined relative position is determined to be invalid if a first distance between a first boundary of the first section of the first part and a second boundary of the second section of the first part is different from a second distance between the first magnetic field sensor and the second magnetic field sensor and a level change has been determined to have taken place for both the first magnetic field sensor and the second magnetic field sensor.

7. The method according to claim 1, wherein the at least one magnetic field sensor is a Hall sensor, and wherein the spatial direction is a magnetic field direction detected by the Hall sensor.

8. The method according to claim 1, wherein one of the first part and the second part rotates in relation to the other of the first part and the second part.

9. The method according to claim 1, wherein the position sensor is situated in a drive unit, wherein the first part of the position sensor includes a magnet-wheel non-rotatably arranged on a motor armature shaft of the drive unit, wherein the second part of the position sensor is coupled to a housing of the drive unit, and wherein the determined relative position indicates a rotation of the motor armature shaft in relation to a stator of an electric motor.

10. The method according to claim 9, wherein the drive unit is an electric motor-transmission drive unit.

11. The method according to claim 9, wherein the position sensor is used to adjust an operating element in a motor vehicle.

12. The method according to claim 11, wherein the operating element includes at least one of a window, a sliding sunroof, and a pop-up sunroof.

13. The method according to claim 9, wherein a position of the operating element is determined from a rotation of the motor armature shaft in relation to the stator of the electric motor.

14. The method according to claim 1, further comprising the step of determining at least one of a velocity, an acceleration, a direction of relative motion of the first part and the second part, and a force transmitted by at least one of the first part and the second part as a function of the signal.

15. The method according to claim 1, further comprising the steps of:
   disabling the at least one magnetic field sensor,
   moving the first part and the second part in a transition region of the first section and the second section a predetermined distance that is substantially smaller than a size of the transition region, and
   enabling the at least one magnetic field sensor,
   wherein the steps are repeated until the first level is different from the second level.

16. The method according to claim 1, wherein a level change detected while the at least one magnetic field sensor is disabled and the first part is at a standstill in relation to the second part is determined to be invalid.

17. The method according to claim 16, wherein the analyzing step is performed by a signal-processing arrangement that is controlled by a program running in a normal operation mode, wherein the program is interrupted if the valid level change is recognized, wherein the recognizing step is performed by the signal-processing arrangement in an interrupt subprogram, and wherein the program returns to the normal operation mode after recognizing the valid level change.

18. The method according to claim 17, wherein a flag is set prior to disabling the at least one magnetic field sensor, wherein the valid level change is not recognized while the flag is set, and wherein the flag is reset after the at least one magnetic field sensor is enabled.

19. The method according to claim 16, wherein the at least one magnetic field sensor is disabled by switching off at least one power supply for the at least one magnetic field sensor, wherein the at least one magnetic field sensor is enabled by switching on the least one power supply for the at least one magnetic field sensor, and wherein level changes occurring after a first predetermined time period after the at least one power supply for the at least one magnetic field sensor is enabled are determined to be valid.

20. The method according to claim 19, wherein the first predetermined time period is selected so that the at least one magnetic field sensor is operational after the first predetermined time period has passed.

21. A device for operating a position sensor having a first part and a second part, one of the first part and the second part movable in relation to the other one of the first part and the second part, the first part having a first section magnetized in a first direction and a second section magnetized in a second direction that is different from the first direction, comprising:
   at least one magnetic field sensor detecting a first magnetic field of the first part at a first predetermined time and converting the first detected magnetic field into a first signal as a function of a polarity of a first magnetic field component of the first magnetic field in a spatial direction, the first signal having one of a first level and a second level, the at least one magnetic field sensor detecting a second magnetic field of the first part at a second predetermined time and converting the second detected magnetic field into a second signal as a function of a polarity of a second magnetic field component in the spatial direction, the second signal having one of the first level and the second level; and
   a signal processing arrangement analyzing the first signal to determine a relative position of the first part in relation to the second part, storing a first determined level of the first signal, and detecting whether there is a level change between the first determined level of the first signal and a second determined level of the second signal,
   wherein the first magnetic field is detected prior to a disabling of the at least one magnetic field sensor when the first part is at a standstill in relation to the second part, wherein the second magnetic field is detected when the at least one magnetic sensor is enabled again, and wherein the level change is determined to be valid if the first determined level of the first signal is different from the second determined level of the second signal.

22. The device according to claim 21, wherein the at least one magnetic field sensor includes a first magnetic field sensor and a second magnetic field sensor.

* * * * *